United States Patent [19]
Mollard et al.

[11] 3,994,819

[45] Nov. 30, 1976

[54] METHOD FOR THE PREPARATION OF ACICULAR PARTICLES CONTAINING IRON AND OTHER DIVALENT METALS

[75] Inventors: Paul Mollard, Murianette; Jacques Paris, Lyon; Abel Rousset, Caluire, all of France

[73] Assignee: Agence Nationale de Valorisation de la Recherche (ANVAR), Neuilly-sur-Seine, France

[22] Filed: Sept. 5, 1975

[21] Appl. No.: 610,720

[30] Foreign Application Priority Data
Sept. 13, 1974  France .............................. 74.31738
July 17, 1975  Switzerland ......................... 9357/75

[52] U.S. Cl. ............................. 252/182; 252/62.56; 252/62.6; 252/62.62; 252/62.64; 423/138; 423/151
[51] Int. Cl.² .......................................... C04B 35/26
[58] Field of Search .............. 252/182, 62.56, 62.64, 252/62.62, 62.6; 423/138, 151; 260/439 R

[56] References Cited
UNITED STATES PATENTS
3,317,574  5/1967  Morita et al. ..................... 252/62.56
3,873,461  3/1975  Mollard et al. .................. 252/62.56
3,897,354  7/1975  Woditsch et al. ................ 252/62.56

*Primary Examiner*—Benjamin R. Padgett
*Assistant Examiner*—Irwin Gluck
*Attorney, Agent, or Firm*—Dowell & Dowell

[57] ABSTRACT

The invention concerns the preparation of acicular particles of mixed oxalates of iron and of one or more metals of the group consisting of cobalt, nickel, copper, manganese, zinc, magnesium and cadmium. The method consists in preparing a first solution containing cations of iron and of the divalent metal or metals, and a second solution containing oxalic acid, one of the said solutions further containing $Cl^-$ and $SO_4^{2-}$ anions and at least the second solution containing alcohol with preferably a light hydrocarbon. The first solution is poured very slowly (1 drop every 10 seconds) into the second one, conveniently at temperature below 0° C, while the latter is strongly stirred. The concentration in alcohol is preferably maintained at at least 50% in the second solution during the whole pouring process which should be effected with at least a slight excess of oxalic acid. The particles obtained may be treated for the preparation of solid solutions of oxides of iron and of the divalent metal or metals for the manufacture of magnetic tapes and the like.

14 Claims, 1 Drawing Figure

METHOD FOR THE PREPARATION OF ACICULAR PARTICLES CONTAINING IRON AND OTHER DIVALENT METALS

The present application has for its object the preparation of solid acicular particles of small size (or length) and of high acicular ratio (length versus width) containing iron and at least one divalent metal such as cobalt, magnesium, manganese, nickel, zinc, cadmium and copper, the ions of which are compatible with the spinel lattice. These particles may be treated as explained in our prior U.S. Pat. No. 3,873,461 and/or in our patent application Ser. No. 427,674 in order to obtain a solid solution of oxides of iron and of one or more divalent metals which affords excellent properties for instance in the manufacture of magnetic tapes or like registering supports.

It has already been proposed to prepare acicular particles of metallic salts of organic acids, and more particularly of iron and cobalt oxalates, by mixing an aqueous solution of an inorganic salt of the metals, as for instance a chloride solution, with an aqueous solution of an organic acid, such as oxalic acid, in the presence of an organic solvent such as an alcohol. But the problem is that the particles thus obtained are either of too large size or that their acicular ratio is too low. In fact the size and the acicular ratio of the particles obtained in the prior art are very roughly proportional to each other.

This results from the fact that in the prior art the solutions were mixed rapidly (within 10 to 100 seconds) without taking into account conditions which are important in the formation of crystals, namely:
  pH of the solutions;
    control of the speed at which the reagents come into contact with each other;
    nature and respective proportions of the anions of the metal salts.

In accordance with the present invention there is prepared a first solution containing chlorides and/or sulphates of divalent iron and of a divalent metal of the group formed of cobalt, magnesium, manganese, nickel, zinc, cadmium and copper, and a second solution containing oxalic acid, one at least of said solutions having a pH lower than 2 and one at least of said solutions containing an alcohol, and the first solution is poured very slowly into the second one in such manner that the successive precipitated particles of mixed oxalate be always formed substantially in the same conditions of pH and of temperature and in the presence of an excess of oxalic acid.

In a preferred embodiment, the first solution, which contains chlorides and sulphates, is of merely aqueous character, alcohol being only provided in the second one.

Sulphuric acid may be added to the second solution in order to lower its pH and at the same time to constitute at least part of the sulphate anions required for the precipitation reaction.

The first solution may be prepared by means of chlorides of the metals concerned with an addition of Mohr salt (iron and ammonium sulphate) which is highly stable. Experience shows that an appropriate addition of this salt is sufficient to provide the $SO_4$ anions required in the solution.

The respective percentages of Cl and $SO_4$ anions are preferably 50 to 70% for the first ones and 50 to 30% for the second ones, the best results being obtained with about 60% Cl anions for 40% $SO_4$ anions. Experience tends to demonstrate that $SO_4$ anions are responsible for the acicular shape of the particles, while Cl anions tend to reduce the size of these particles.

The concentration of the aqueous solution containing chlorides and Mohr salt may vary in accordance with the size desired for the particles. It is advantageously equal to 1 mole per liter for obtaining crystallites having a longitudinal dimension of about 1 micron or less.

As above indicated the pH of this aqueous solution should be lower than 2, the value pH = 1 being preferable. Such a low pH avoids any hydrolysis of iron salts.

The second solution (oxalic acid solution) contains preferably from 0.4 to 0.6 mole of oxalic acid per liter. It may be prepared by means of any commercial alcohol and more particularly of usual ethyl alcohol at 95°. Before proceeding to the pouring operation it conveniently receives an addition of a light hydrocarbon such as petroleum ether, since experience demonstrates that such an addition reduces the size of the acicular particles obtained and tends to uniformize these particles during the whole mixing process, without impairing the acicular ratio.

As aforesaid the first solution (aqueous solution containing chlorides and sulphates) should be very slowly poured into the first one (alcoholic solution of oxalic acid), which is preferably strongly agitated during the whole process. Tests have demonstrated that the best results were obtained when pouring one drop of the first solution into the second one every 10 seconds.

It may be of advantage to add alcohol to the second solution as it receives water from the first one. It has been found in this respect that the concentration in alcohol of the second solution should be maintained at about 50% to avoid the formation of irregular particles.

It may also be of advantage to maintain the second solution (alcoholic solution of oxalic acid) at a temperature well below 0° C in order to obtain particles of smaller size with the same acicular ratio. Owing to the presence of alcohol, temperatures as low as −30° C may easily be used. In such a case the second solution should be vigourously agitated during the pouring process in order to avoid the formation of ice. Of course the concentration in alcohol should also be maintained such that any freezing of the second solution is avoided.

It should be noted that the first solution could also be prepared by means of water and of an alcohol. But Mohr salt is poorly soluble in alcohols and therefore the concentration finally obtained would be exaggerately low for most practical purposes if no alcohol were added to the second solution. Also, as aforesaid the anion $SO_4$ could be provided at least in part in the form of sulphuric acid added to the alcoholic solution of oxalic acid, the mixture $SO_4$ + Cl then taking place during the pouring operation itself.

As above indicated, the concentration in alcohol in the second solution should not fall below 50%, since otherwise the particles become irregular, some of them being flat or even more or less granular. There is no uppper limit to the concentration in alcohol apart from the fact that the non-organic salts generally require some water for their proper dissolution.

Oxalic acid could be replaced by other organic acids, such as formic acid or acetic acid. But experience shows that the results obtained with such other acids are often irregular.

EXAMPLE 1

In order to obtain a binary solid solution $(\gamma\text{-}Fe_2O_3)_{0.34}$ $(CoFe_2O_4)_{0.66}$ in the form of acicular particles with a longitudinal dimension below $0.5\mu$ and a mean acicular ratio comprised between 4 and 5, there is first prepared a mixed iron and cobalt oxalate $(Fe_{0.75}Co_{0.25})C_2O_4, 2H_2O$ by proceeding as follows:

A. 0.010 mole of Mohr salt, 0.065 mole of ferrous chloride and 0.025 mole of cobalt chloride are dissolved in 100 ml of a solvent formed of 70% of water and 30% ethyl alcohol. The pH of this first solution is lowered to 1 by a small addition of concentrated hydrochloric acid.

B. 0.12 mole of oxalic acid are dissolved in 200 ml of a solvent formed of 30% water and 70% ethyl alcohol. 66 ml of a mixture of light hydrocarbons, such as petroleum ether, and 1.5 ml of concentrated sulphuric acid are added to this second solution.

C. The first solution is slowly poured into the second one at room temperature and at the rate of one drop every 10 seconds, the said second solution being strongly agitated during the whole process.

When this mixing step is ended, the resultant solution is filtered and the precipitate is washed until ions $SO_4^{2-}$ and $Cl^-$ are fully eliminated.

The acicular particles thus obtained are thereafter treated as explained in our prior application and they retain their morphologic characteristics when transformed into the aforesaid solid binary solution.

EXAMPLE 2

In order to obtain a ternary solid solution $(\gamma\text{-}Fe_2O_3)_{0.334}$ $(CoFe_2O_4)_{0.400}$ $(ZnFe_2O_4)_{0.266}$ in the form of acicular particles having a longitudinal dimension below 1 $\mu$ with an acicular ratio comprised between 4 and 5, there is first prepared a mixed oxalate $(Fe_{0.75}Co_{0.15}Zn_{0.10})C_2O_4, 2H_2O$ by proceeding as follows:

A. 0.040 mole of Mohr salt, 0.035 mole of ferrous chloride, 0.015 mole of cobalt chloride and 0.010 mole of zinc chloride are dissolved in 100ml water. The pH of this first solution is lowered to 1 by a small addition of concentrated hydrochloric acid.

B. 0.12 mole of oxalic acid are dissolved in 200 ml of ethyl alcohol and 66 ml of petroleum ether are added to this second solution.

C. The first solution is slowly poured into the second one at room temperature and at the rate of 1 drop every 15 seconds, the second solution being strongly agitated.

When the mixing process is completed, the solution obtained is filtered and the precipitate is washed until ions $SO_4^{2-}$ and $Cl^-$ are fully eliminated.

The particles which form the precipitate have an average length of 0.8 $\mu$ and an acicular ratio comprised between 7 and 8. They are treated as explained in our prior application or patents and they fully retain their morphologic characteristics. The solid solution finally obtained appears as shown in the annexed drawing.

EXAMPLE 3

Example 2 is repeated, but with the precipitating step being effected at $-20°$ C. The longitudinal dimensions of the particles are reduced to about 0.4 to 0.5 $\mu$.

Owing to the high initial percentage of alcohol, no addition of the latter has to be effected during the precipitation process.

What is claimed is:

1. A method for the preparation of acicular particles containing iron and at least one divalent metal of a first group consisting of cobalt, nickel, copper, manganese, zinc, magnesium and cadmium, the ions of which are compatible with the spinel lattice, comprising the following steps:
   A. preparing a first solution containing cations of iron and of at least one divalent metal of said first group;
   B. preparing a second solution containing oxalic acid;
   C. one at least of said first and second solutions containing anions of a second group consisting of chlorides and sulphates, one at least of said first and second solutions having a pH lower than 2, and one at least of said first and second solutions containing alcohol;
   D. pouring progressively said first solution into said second solution, while agitating the latter, and at such a slow rate as to obtain precipitation of substantially uniform acicular particles of mixed oxalates having at the same time a length not exceeding $1\mu$ and an acicular ratio higher than 3.

2. In a method as claimed in claim 1, said second solution containing alcohol and the concentration in alcohol of said second solution being of at least 50% during the whole pouring step.

3. A method as claimed in claim 1, wherein alcohol is only present in said second solution, said first solution being merely aqueous.

4. A method as claimed in claim 3, wherein said second solution is prepared by means of ethyl alcohol at substantially 95°.

5. A method as claimed in claim 1, wherein sulphuric acid is added to said second solution to lower its pH and to form at least part of said sulphate anions.

6. A method as claimed in claim 1, wherein said first solution is prepared by means of chlorides of iron and of said at least one divalent metal of said first group and of Mohr salt.

7. A method as claimed in claim 1, wherein said first solution contains 50 to 70% chloride anions and 50 to 30% sulphate anions.

8. A method as claimed in claim 1, wherein the concentration of said first solution is substantially molar.

9. A method as claimed in claim 1, wherein the concentration of said second solution in oxalic acid is substantially comprised between 0.4 and 0.8 mole per liter.

10. A method as claimed in claim 1, wherein a light hydrocarbon is added to said second solution.

11. A method as claimed in claim 1, wherein the pouring step is effected at a temperature below 0° C.

12. A method as claimed in claim 3, wherein the pouring step is effected while said second solution is maintained at a temperature below 0° C, alcohol being added to said second solution during said pouring step in such proportion that said second solution remains liquid in spite of the addition of the water forming said first solution.

13. A method as claimed in claim 3, wherein said first solution is poured into said second solution in the form of successive drops at such a rate that the precipitated particles of mixed oxalate be always formed substantially in the same conditions of pH and of temperature and in the presence of an excess of oxalic acid, the proportion of alcohol in said second solution being of at least 50% during the whole pouring step.

14. A method as claimed in claim 1, wherein said first solution is poured into said second solution at a rate not exceeding 20 cm³ per hour.

* * * * *